United States Patent [19]

Tsuchiya et al.

[11] Patent Number: 4,692,483

[45] Date of Patent: Sep. 8, 1987

[54] WATER-BASED PAINT COMPOSITION

[75] Inventors: Yasuyuki Tsuchiya, Hirakata; Hiroyuki Sakamoto, Nishinomiya, both of Japan

[73] Assignee: Nippon Paint Co., Ltd., Osaka, Japan

[21] Appl. No.: 855,644

[22] Filed: Apr. 25, 1986

[30] Foreign Application Priority Data

Apr. 26, 1985 [JP] Japan ................................ 60-91715
Apr. 26, 1985 [JP] Japan ................................ 60-91716

[51] Int. Cl.$^4$ .................... C08K 3/20; C08L 83/00; C08L 37/00
[52] U.S. Cl. .................... 523/406; 523/201; 524/517
[58] Field of Search ................ 524/517; 523/406, 201

[56] References Cited

U.S. PATENT DOCUMENTS

| | | | |
|---|---|---|---|
| 3,243,401 | 3/1966 | Floyd | 523/406 |
| 3,365,411 | 1/1968 | Mertzwailler et al. | 524/517 |
| 3,658,795 | 4/1972 | Dainer | 525/68 |
| 3,944,512 | 3/1976 | Bröecker et al. | 524/517 |
| 3,952,023 | 4/1976 | Kaiya et al. | 525/285 |
| 4,075,135 | 2/1978 | Jozwiak, Jr. et al. | 524/833 |
| 4,091,052 | 5/1978 | Horii et al. | 525/245 |
| 4,094,831 | 6/1978 | Sandstrom | 524/517 |
| 4,094,836 | 6/1978 | Tasui et al. | 523/501 |
| 4,096,106 | 6/1978 | Kita | 524/549 |
| 4,154,708 | 5/1979 | Araki et al. | 524/572 |
| 4,162,240 | 7/1979 | Hino et al. | 524/813 |
| 4,178,186 | 12/1979 | Tasui et al. | 525/327.7 |
| 4,252,727 | 2/1981 | Tasui et al. | 106/287.24 |
| 4,255,312 | 3/1981 | Araki et al. | 524/556 |
| 4,256,619 | 3/1981 | Miyaguchi et al. | 524/571 |
| 4,294,940 | 10/1981 | Hino et al. | 528/73 |
| 4,336,347 | 6/1982 | Sagoh et al. | 525/139 |
| 4,341,682 | 7/1982 | Tobias | 523/406 |
| 4,371,665 | 2/1983 | Hino et al. | 525/113 |
| 4,431,689 | 2/1984 | Günter | 523/406 |
| 4,463,134 | 7/1984 | Hino et al. | 525/113 |

FOREIGN PATENT DOCUMENTS 70129333 12/1970 Japan.

*Primary Examiner*—Joseph Schofer
*Assistant Examiner*—N. Sarofim
*Attorney, Agent, or Firm*—Millen & White

[57] ABSTRACT

A water-based paint composition comprising:

(A) a reaction product prepared by reacting a butadiene-based polymer and/or a drying oil with an $\alpha,\beta$-unsaturated dicarboxylic acid anhydride followed by reacting with water, a primary monoalcohol or a dialkylamine; and (B) a modified epoxy resin with acrylic acid, methacrylic acid or unsaturated fatty acid, or a modified phenol resin with glycidyl acrylate or methacrylate, components (A) and (B) being dispersed in an aqueous medium containing a base.

15 Claims, No Drawings

WATER-BASED PAINT COMPOSITION

FIELD OF THE INVENTION

This invention relates to a cold-curable, water-based paint composition. The paint composition is particularly suitable for coating metallic substrates using the anodic electrodeposition technique although other conductive and nonconductive substrates may also be coated with this paint composition using conventional coating methods such as dipping or spraying.

BACKGROUND OF THE INVENTION

Maleinized polybutadiene, maleinized drying oils, their half esters and half amides have been most widely used as a resin component of electrodeposition paints because of their higher stability in electrodeposition coating bath. However, they have certain disadvantages. They exhibit relatively low anticorrosive effect on iron-based substrates and require relatively high baking temperatures.

The anticorrosive property may be improved by combining with a water-soluble epoxy resin such as epoxy resin fatty acid esters. This, however, greatly decreases the stability of resinous components in the electrodeposition coating bath. Numerous attempts have been made to compensate the above disadvantages of maleinized polybutadiene, maleinized oils, their half esters and half amides. See, Japanese Patent Publication Nos. 21691/72 and 4058/74, for example.

Despite these and other attempts, the prior art paint compositions of the above type failed to meet all of the conditions of cold-curability, anti-salt spraying and bath stability. Accordingly, there exists strong need for a water-based paint composition of the above type which may satisfy all of the above conditions.

SUMMARY OF THE INVENTION

It is, therefore, a principal object of the present invention to provide a water-based paint composition comprising maleinized polybutadiene and/or maleinized drying oil and having excellent cold-curing, anti-salt spraying and stability properties. Other objects and advantages of this invention will become apparent as the description proceeds.

These and other objects may be achieved in accordance with this invention by providing a water-based paint composition comprising:

(A) 100 parts by weight of a resinous product prepared by the steps of (a) reacting (i) a butadiene-based polymer having an average number molecular weight of 500 to 5,000 and an iodine number of 100 to 500, a drying oil having an iodine number greater than 100, or a mixture thereof, with 100 to 300 millimoles per 100 g of (i) of (ii) a dicarboxylic acid anhydride of the formula:

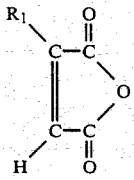

wherein $R_1$ represents a hydrogen atom, a halogen atom or methyl, and (b) reacting the resulting product with at least 0.8 moles per mole of said acid anhydride of (iii) water, a primary monoalcohol, a dialkylamine or a mixture thereof; and (B) 10 to 200 parts by weight of (i) a product prepared by reacting a compound having at least one glycidyl group and an average molecular weight of 300 to 4,000 with 0.8 to 1.1 moles per said glycidyl group of an ethylenically unsaturated carboxylic acid of the formula:

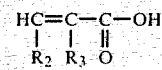

wherein $R_2$ and $R_3$ independently represent a hydrogen atom or methyl, or an unsaturated fatty acid having a molecular weight of 100 to 350 and an iodine number greater than 100, (ii) a product prepared by reacting a polymeric phenol derivative having an average number molecular weight of 300 to 4,000 with at least 0.8 moles per moles of said phenol derivative of a monoglycidyl ester of the formula:

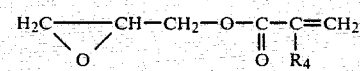

wherein $R_4$ represents a hydrogen atom or methyl, or a mixture of (i) and (ii); said components (A) and (B) being dispersed in an aqueous medium containing an amount of a base sufficient to neutralize at least 20% of free carboxyl groups remaining in said components (A) and (B).

In one aspect of the present invention, said component (A) may be replaced at least partially by (i) a product prepared by reacting the product of said step (a) with 10 to 300 millimoles per 100 g of said butadiene-based polymer and/or said drying oil of a compound of the formula:

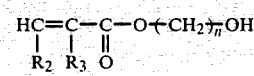

wherein $R_2$ and $R_3$ are as defined, and n is 2 or 3, and then optionally with less than 290 millimoles per 100 g of said butadiene-based polymer and/or said drying oil of water, a primary alcohol, a dialkylamine or a mixture thereof, (ii) a product prepared by reacting the product of said step (a) with 80 to 300 millimoles per 100 g of said butadiene-based polymer and/or said drying oil of water, a primary alcohol, a dialkylamine or a mixture thereof, and then with 10 to 500 millimoles per 100 g of said butadiene-based polymer and/or said drying oil of a monoglycidyl ester of the formula:

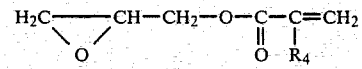

wherein $R_4$ is as defined, or a mixture of said products (i) and (ii).

The paint composition of the present invention preferably contains 0.005 to 1.0 parts by weight calculated as elementary metal of an organic acid salt of cobalt, manganese, iron, lead, calcium or zirconium, manganese dioxide or mixture thereof as a paint dryer.

The paint composition of this invention occurs as an aqueous dispersion of resinous particles formed of an inner core of hydrophobic component (B) having higher anticorrosive property and an outer shell layer of hydrophilic component (A) having higher water-dispersibility. It is for this reason that the composition has higher anticorrosive effect without compromising its stability.

The cold curability of the paint composition may be enhanced by introducing a curing site of active carbon-to-carbon double bond to the component (B).

DETAILED DISCUSSION

Component (A)

A typical example of butadiene-based polymers having an average number molecular weight of 500 to 5,000 and an iodine number of 100 to 500 is liquid polybutadiene. Copolymers of butadiene with other conjugated diene monomers such as methylbutadiene, dimethylbutadiene and chloroprene, or with minor proportions of vinyl monomers such as styrene, vinyl acetate, acrylonitrile and alkyl (meth)acrylate may also be used. Liquid polybutadiene is commercially available in a large quantity and thus most preferable.

In place of or in combination with the butadiene-based polymers, a drying oil having an iodine number greater than 100 may be used as the starting material of component (A). Examples thereof include natural drying or semi-drying oils such as Chinese tung oil, linseed oil, safflower oil and soybean oil, and synthetic drying oils such as dehydrated castor oil.

Examples of unsaturated dicarboxylic acid anhydrides of the formula:

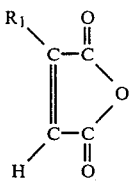

wherein $R_1$ is as defined, include maleic anhydride, citraconic anhydride and chloromaleic anhydride.

The addition-reaction of the above $\alpha,\beta$-unsaturated dicarboxylic acid anhydride to the conjugated diene polymer or drying oil is well-known. The ring-cleaving reaction of the resultant adduct with water, a primary monoalcohol or a dialkylamine is also well-known.

The component (A) may be prepared in conventional manner by the steps of (a) reacting the butadiene-based polymer with the above acid anhydride, and then (b) reacting the resultant adduct with the above ring-cleaving agent. The amount of said acid anhydride should range from 100 to 300 millimoles per 100 g of the starting butadiene-based polymer or drying oil or a combination thereof for rendering the resultant adduct water-soluble. The acid anhydride ring of the resultant adduct may be cleaved to a corresponding dicarboxylic acid, half ester and mono amide with water, monoalcohol and dialkylamine, respectively. Mixtures of these cleaving agents may be used. At least 0.8 moles of the cleaving agent should be used per one mole of the acid anhydride to decrease the remaining acid anhydride function which is otherwise reactive with the hydroxyl group present in the component (B) to form a gel in the final composition.

Examples of primary monoalcohols which may be used in the ring-cleaving reaction include lower alkanols such as methanol or ethanol, and ethyleneglycol monoalkyl ethers such as ethylcellosolve. These primary monoalcohols may be used in large excess as a constituent of aqueous medium in which resinous components are suspended.

Examples of usable dialkylamine include dimethylamine, diethylamine and other di-loweralkylamines.

In order to render the component (A) cold curable, acrylic unsaturation function may be introduced thereto while retaining the water-solubility. This may be accomplished by the following two methods.

In the first method, the acid anhydride adduct of the starting butadiene-based polymer and/or drying oil is reacted with a compound of the formula:

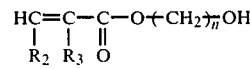

wherein $R_2$, $R_3$ and n are as defined. Examples or compounds having the above formula include 2-hydroxyethyl (meth)acrylate or 2-hydroxypropyl (meth)acrylate. 10 to 300 millimoles of the acrylate or methacrylate are used per 100 g of the starting butadiene-based polymer and/or drying oil. 10 to 100% of the acid anhydride rings in the adduct are cleaved through this reaction to give a corresponding half ester. If more than 20% of the acid anhydride rings remain unreacted, the half ester may be reacted with less than 290 millimoles of water, a primary monoalcohol, a dialkylamine or a mixture of these ring-cleaving agents as hereinbefore discussed to decreases the acid anhydride content to less than 20%.

In the second method, the acid anhydride adduct may be reacted with 80 to 300 millimoles of water, a primary monoalcohol, a dialkylamine or a mixture of these ring-cleaving agents to cleave at least 80% of acid anhydride rings to a corresponding dicarboxylic acid, half ester or half amide. The resulting product is reacted in the next step with 10 to 500 millimoles of a monoglycidyl ester of $\alpha,\beta$-unsaturated carboxylic acid of the formula:

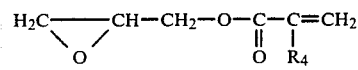

wherein $R_4$ is as defined. The molar proportion of the above glycidyl ester should be more than 10% relative to the molar proportion of the acid anhydride used, but the proportion preferably does not exceed such an amount that more than 100 millimoles of free carboxylic acid groups formed by the ring cleavage reaction remain unreacted. This is necessary for imparting the component (A) with a sufficient water-solubility.

The products of the above two methods may be used alone or in combination.

Component (B)

Examples of compounds having at least one glycidyl group and an average molecular weight of 300 to 4,000 include various epoxy resins such as bisphenol A epoxy resins, bisphenol F epoxy resins and novolac phenol epoxy resins.

Typical examples of ethylenically unsaturated carboxylic acid of the formula:

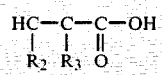

wherein $R_2$ and $R_3$ are as defined, are acrylic acid and methacrylic acid.

Examples of unsaturated fatty acids having a molecular weight of 100 to 350 and an iodine number greater than 100 include linolenic acid, linoleic acid, eleostearic acid, linseed oil fatty acid, tall oil fatty acid, dehydrated castor oil fatty acid, synthetic unsaturated fatty acids (e.g. HIDIENE series sold by Soken Kagaku Co., Ltd.) and the like.

The above unsaturated acid should be reacted with the epoxy resin in a proportion of 0.8 to 1.1 moles per one equivalent of glycidyl group possessed by the resin so that the acid number of the reaction product is substantially zero.

Component (B) may be a reaction product of a polymeric phenol derivative having an average number molecular weight of 300 to 4,000 with a monoglycidyl ester of the formula:

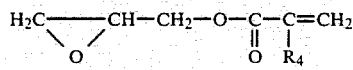

wherein $R_4$ is as defined.

Examples of polymeric phenol derivatives include phenol resins. Either novolac or resol type resin may be used. They are prepared, as is well-known, by reacting a phenol with an aldehyde, typically formaldehyde in the presence of an alkali or acid catalyst.

Examples of monoglycidyl esters are glycidyl acrylate and glycidyl methacrylate.

The glycidyl ester should be used in a proportion of at least 0.8 moles per mole of said phenol derivative to introduce a sufficient number of curable sites of carbon-to-carbon double bond.

The component (B) may consist of either one of the above reaction products or a mixture thereof.

Metallic Dryer Compounds

Component (A) (also component (B) containing unsaturated fatty acid moiety) has a number of carbon-to-carbon double bonds which are susceptible to an oxidative polymerization reaction.

The paint composition of the present invention may contain a metallic compound capable of accelerating this oxidative polymerization reaction in order that the paint composition may be cured at ambient temperature.

Examples of metallic compounds which may be used for this purpose include manganese dioxide, cobalt, iron, lead, calcium or zirconium salt of an organic acid such as formic, acetic, lactic naphthenic or octanoic acid. Mixture of these compounds may also be used.

Formulation of Paint Composition

The paint composition of the present invention contains components (A) and (B) in proportions of 100 parts by weight and 10 to 200 parts by weight, respectively on dry basis. If the amount of component (B) is too small, the anticorrosive property of the paint composition is not satisfactory. Conversely, excessive amounts of component (B) tend to decrease the storage stability of the composition.

When the metallic dryer compound is used, an amount thereof of 0.005 to 1.0 parts by weight calculated as elementary metal is preferable. Too small amounts are not effective, whereas excessive amounts decrease the storage stability of the composition.

Component (A) and component (B) are dispersed in an aqueous medium containing an amount of a base sufficient to neutralize at least 20% of free carboxyl groups remaining in components (A) and (B). If the amount of neutralizing base is too small, component (A) will not be dissolved completely.

Examples of neutralizing bases include ammonia, diethanolamine, triethanolamine, methyl ethanolamine, diethylamine, morphorine, potassium hydroxide and the like.

Aqueous media in which the resinous components are suspended may be water or mixtures of water and a water-miscible organic solvent such as ethylcellosolve, propylcellosolve, ethyleneglycol dimethyl ether, diacetone alcohol, 4-methoxy-4-methylpentanone-2, methyl ethyl ketone and the like. The aqueous medium may contain, if desired, a minor proportion of a water-immiscible solvent such as xylene, toluene, methyl isobutyl ketone, 2-ethylhexanol and the like. Ethyleneglycol monoalkyl ethers may also act as a ring-cleaving agent in the production of component (A).

Component (A) is soluble in water and thus may be easily dispersed in an aqueous medium, while component (B) is hardly soluble in water. Thus component (B) may be dispersed in the aqueous medium as a core component of emulsion particles surrounded by a shell layer of component (A). Any known emulsifier may be used for this purpose.

The paint composition may further contain conventional pigments. Examples thereof include colorants such as titanium dioxide, ferric oxide and carbon black; extender pigments such as aluminum silicate and precipitated barium sulfate; and rust-proof pigments such as aluminum phorphomolibdate, strontium chromate, basic lead silicate and lead chromate.

The paint composition of this invention may be applied on various substrates using conventional coating techniques such as dipping and spraying as conventional water-based paints. In this case the paint may preferably have a non-volatile content of 40 to 60% by weight and applied to a dry film thickness of 15 to 30 microns.

Alternatively, the paint composition of this invention may be applied using the electrodeposition coating technique on a conductive substrate acting as an anode. In this case the paint may preferably have a non-volatile content of 10 to 20% by weight and applied to a dry film thickness of 15 to 30 microns.

After applying, the paint film may be dried at a temperature of about 80° C. and then cured at ambient temperature, or higher temperatures.

The invention is illustrated by the following examples in which all percents are by weight unless otherwise indicated.

COMPONENT (A)

Production Example 1

| | |
|---|---|
| NISSEKI polybutadiene B-1500[1] | 1000 g |
| ANTIGEN 6C[2] | 10 g |

-continued

| | |
|---|---|
| Maleic anhydride | 250 g |
| Diethylamine | 0.5 g |
| Deionized water | 46 g |
| Ethylcellosolve | 340 g |

(1)Nippon Petrochemical Co., Ltd., 1,2-vinyl = 65%, trans = 14%, cis = 16%, $\overline{Mn}$ = 1500.
(2)Sumitomo Chemical Co., Ltd., N—methyl-N'—(1,3-dimethyl-butyl)-p-phenylenediamine.

A 2 liter flask equipped with a reflux condenser was charged with liquid polybutadiene, maleic anhydride and ANTIGEN 6C. The mixture was reacted at 190°–200° C. for about 5 hours. The completion of reaction was indicated by a color reaction test with dimethylaniline.

After the reaction mixture was cooled to 100° C., a mixture of deionized water and diethylamine was dripped in over 30 minutes. Stirring was continued for about 1 hour until an acid number of 190 was reached. After adding ethylcellosolve, the mixture was stirred at 80° C. for about 1 hour.

Production Example 2

| | |
|---|---|
| NISSEKI polybutadiene B-1500 | 500 g |
| Linseed oil | 500 g |
| ANTIGEN 6C | 10 g |
| Maleic anhydride | 250 g |
| Deionized water | 46 g |
| Diethylamine | 0.5 g |
| Ethylcellosolve | 340 g |

The procedure of Production Example 1 was repeated except that 1000 g of NISSEKI polybutadiene B-1500 was replaced by a mixture of 500 g of NISSEKI polybutadiene B-1500 and 500 g of linseed oil.

Production Example 3

| | |
|---|---|
| NISSEKI polybutadiene B-1500 | 1000 g |
| ANTIGEN 6C | 10 g |
| Maleic anhydride | 250 g |
| 2-Hydroxyethyl methacrylate | 130 g |
| Dimethyl benzylamine | 1 g |
| Diethylamine | 0.3 g |
| Deionized water | 27 g |
| Ethylcellosolve | 340 g |

A 2 liter flask equipped with a reflux condenser was charged with liquid polybutadiene, maleic anhydride and ANTIGEN 6C. The mixture was reacted at 190°–200° C. for about 5 hours. The completion of reaction was determined by a color reaction test with dimethylaniline.

After the reaction mixture was cooled to 120° C., a mixture of 2-hydroxyethyl methacrylate and dimethyl benzylamine was added thereto. The mixture was allowed to react at 120°–30° C. for 3 hours until an acid number of 160 was reached when titrating by the pyridine solvent method.

After the reaction mixture was cooled to 100° C., a mixture of deionized water and diethylamine was dripped over 30 minutes with stirring. After adding ethylcellosolve, the mixture was stirred for about 1 hour at 80° C.

Production Example 4

| | |
|---|---|
| NISSEKI polybutadiene B-1000 | 500 g |
| Linseed oil | 500 g |
| ANTIGEN 6C | 10 g |
| Maleic anhydride | 250 g |
| 2-Hydroxyethyl methacrylate | 130 g |
| Dimethyl benzylamine | 1 g |
| Ethylcellosolve | 350 g |

The procedure of Production Example 3 was repeated except that 1000 g of NISSEKI polybutadiene B-1500 was replaced by 500 g of NISSEKI polybutadiene B-1000 and 500 g of linseed oil without deionized water.

Production Example 5

| | |
|---|---|
| NISSEKI polybutadiene B-1500 | 1000 g |
| ANTIGEN 6C | 10 g |
| Maleic anhydride | 250 g |
| Diethylamine | 0.5 g |
| Deionized water | 46 g |
| Glycidyl methacrylate | 140 g |
| Dimethyl benzylamine | 2 g |
| Ethylcellosolve | 350 g |

The addition reaction of liquid polybutadiene with maleic anhydride and the ring cleavage of the resulting adduct with the mixture of deionized water and diethylamine were carried out as in Production Example 1.

To the reaction mixture having an acid number of 195 were added glycidyl methacrylate and dimethyl benzylamine. Then the mixture was allowed to react at an inner temperature of 120°–130° C. for about 3 hours until an acid number of 140 was reached. This mixture was cooled to 100° C. and stirred with ethylcellosolve for about 1 hour.

COMPONENT (B)

Production Example 6

| | |
|---|---|
| EPOTOTO YD-014(3) | 950 g |
| Ethylcellosolve | 240 g |
| Hydroquinone | 10 g |
| Acrylic acid | 65 g |
| Dimethyl benzylamine | 5 g |

(3)Toto Kasei Co., Ltd., epoxy resin, epoxy equivalent = 950.

A 2 liter flask equipped with a reflux condenser was charged with EPOTOTO YD-014 and ethylcellosolve. The temperature was gradually raised to 120° C. with stirring to make a solution. To the solution were added hydroquinone, acrylic acid and dimethyl benzylamine. The mixture was allowed to react at 120° C. for 4 hours until an acid number less than 1 was reached.

Production Example 7

| | |
|---|---|
| EPOTOTO YD-012(4) | 650 g |
| Ethylcellosolve | 220 g |
| Hydroquinone | 10 g |
| HIDIENE(5) | 280 g |
| Dimethyl benzylamine | 5 g |

(4)Toto Kasei Co., Ltd., epoxy resin, epoxy equivalent = 650.
(5)Soken Kagaku Co., Ltd., synthetic drying oil, acid number = 198, iodine number = 167, conjugated diene content = 52%.

The procedure of Production Example 6 was repeated except that 950 g of EPOTOTO YD-014 was replaced by 650 g of EPOTOTO YD-012, ethylcellosolve was decreased to 220 g and 65 g of acrylic acid was replaced by 280 g of HIDIENE.

Production Example 8

| TAMANOL T521[6] | 700 g |
|---|---|
| Ethylcellosolve | 185 g |
| Hydroquinone | 10 g |
| Glycidyl methacrylate | 100 g |
| Dimethyl benzylamine | 5 g |

[6]Arakawa Kagaku Kogyo Co., Ltd., plain phenolformaldehyde condensate.

A 2 liter flask equipped with a reflux condenser was charged with TAMANOL T521 and ethylcellosolve. The temperature was gradually raised to 120° C. with stirring to make a solution. To the solution were added hydroquinone, glycidyl methacrylate and dimethyl benzylamine. The mixture was allowed to react at 120° C. for 3.5 hours until an epoxy equivalent greater than 6,000 was obtained.

Production Example 9 (for comparison)

| EPOTOTO YD-014 | 950 g |
|---|---|
| SHELL ME6K[7] | 330 g |
| ANTIGEN 6C | 10 g |
| HIDIENE | 280 g |
| Dimethyl benzylamine | 5 g |
| Phthalic anhydride | 150 g |

[7]Shell Chemical Co., 4-methoxy-4-methylpentanone-2.

A 2 liter flask equipped with a reflux condenser was charged with EPOTOTO YD-014 and SHELL ME6K. The temperature was gradually raised to 120° C. with stirring to make a solution. To the solution were added ANTIGEN 6C, HIDIENE and dimethyl benzylamine. The mixture was reacted at 120° C. for 4 hours until an acid number less than 1 was reached. Then phthalic anhydride was added and allowed to react at 140° C. for 2 hours to obtain an acid number of 40.

EXAMPLE 1

125 g of varnish prepared in Production Example 1 and 125 g of varnish prepared in Production Example 6 were taken in a beaker and thoroughly mixed. After 2 g of NOIGEN EA-150 (Dai-Ichi Kogyo Seiyaku Co., Ltd., nonionic surfactant) and 4 g of cobalt octanate were added, the mixture was diluted with a mixture of 732 g of deionized water and 12 g of diethylamine to give a coating bath having a nonvolatile content of about 20%.

Electrodeposition coating was carried out by dipping a dulled steel plate (Nippon Test Panel Co., Ltd., for automobile production) surface-treated with zinc phosphate (GRANODINE SD2000, Nippon Paint Co., Ltd.) in the above coating bath, and applying electric current using the steel plate as anode at a voltage of 100 V for 3 minutes. The deposited film was washed with water and baked in an oven at 130° C. for 30 minutes to give a cured film having a film thickness of 20 microns. Properties of the film are shown in Table 1.

The stability of the coating bath was evaluated at 24th hour after the preparation and after stirring for one month at 30° C.

The results obtained are shown in Table 2.

EXAMPLE 2

The procedure of Example 1 was repeated except that 125 g of the varnish of Production Example 1 was replaced by 125 g of the varnish of Production Example 2.

EXAMPLE 3

The procedure of Example 1 was repeated except that 125 g of the varnish of Production Example 6 was replaced by 125 g of the varnish of Production Example 7.

EXAMPLE 4

The procedure of Example 1 was repeated except that 125 g of the varnish of Production Example 6 was replaced by 125 g of the varnish of Production Example 8.

EXAMPLE 5

The procedure of Example 1 was repeated except that cobal octanate was replaced by iron naphthenate.

Comparative Example 1

The procedure of Example 1 was repeated except that the varnish of Production Example 1 was increased to 250 g, and 125 g of the varnish of Production Example 6 was replaced by 18 g of diethylamine.

Comparative Example 2

The procedure of Example 1 was repeated except that the varnish of Production Example 1 and the varnish of Production Example 6 were replaced by 250 g of the varnish of Production Example 9 and 9 g of diethylamine.

TABLE 1

| | Film Properties | | | | | | |
|---|---|---|---|---|---|---|---|
| | Example No. | | | | | Comparative Example No. | |
| Test item | 1 | 2 | 3 | 4 | 5 | 1 | 2 |
| Pencil hardness | HB | HB | F | HB | F | 4B | HB |
| Solvent resistance[9] | O | O | | Δ | | X | Δ |
| Corrosion resistance[10] | | O | O | Δ | Δ | X | Δ |

[9]Rubbing test with ethanol impregnated fabric with 20 reciprocations.
  No change;
O Dull in part;
Δ Dull throughout the surface;
X Exposure of substrate
[10]5% salt spray test for 240 hours. Judged by maximum width of rust developed from the cut edge of applied film.
  less than 1 mm;
O 1-3 mm;
Δ 3-5 mm;
X greater than 5 mm.

TABLE 2

| | Stability[11] | | | | | | |
|---|---|---|---|---|---|---|---|
| | Example No. | | | | | Comparative Example No. | |
| Item | 1 | 2 | 3 | 4 | 5 | 1 | 2 |
| 24 hours after the preparation | O | O | O | O | O | O | O |
| One month stirring at 30° C. | O | O | O | O | O | O | X |

[11]The paint composition was filtered through 400 mesh wire screen.
O No agglomerated particles.
X Screen was plugged with agglomerated particles.

EXAMPLE 6

125 g of the varnish of Production Example 3 and 125 g of the varnish of Production Example 6 were taken in a beaker and thoroughly mixed. After 2 g of NOIGEN EA-150 and 4 g of manganese naphthenate were added, the mixture was diluted with a mixture of 732 g of deionized water and 12 g of diethylamine to give a coating bath having a nonvolatile content of about 20%.

Electrodeposition coating was carrried out as in Example 1 by dipping a dulled steel plate surface treated with zinc phosphate in the above coating bath, and applying electric current using the steel plate as anode at a voltage of 100 V for 3 minutes. The deposited film was washed with water, dried in an oven at 80° C. for 20 minutes, and allowed to stand for 5 days at room temperature. Properties of the film are shown in Table 3.

EXAMPLE 7

The procedure of Example 6 was repeated except that 125 g of the varnish of Production Example 3 was replaced by 125 g of the varnish of Production Example 4.

EXAMPLE 8

The procedure of Example 6 was repeated except that 125 g of the varnish of Production Example 3 was replaced by 125 g of the varnish of Production Example 5.

EXAMPLE 9

The procedure of Example 6 was repeated except that 250 g of the varnish of Production Example 6 was replaced by 125 g of the varnish of Production Example 7.

EXAMPLE 10

The procedure of Example 6 was repeated except that 125 g of the varnish of Production Example 6 was replaced by 125 g of the varnish of Production Example 8.

TABLE 3

| Time of Evaluation | Item | Ex. 6 | Ex. 7 | Ex. 8 | Ex. 9 | Ex. 10 |
|---|---|---|---|---|---|---|
| Within 24 hrs. after drying 80° C. × 20 min. | Pencil hardness | 4B | 3B | 4B | 3B | 6B |
| | Solvent resistance[9] | X | X | X | X | X |
| | Corrosion resistance[10] | X | X | X | X | X |
| 5 days at room temp. after drying | Pencil hardness | F | HB | F | HB | B |
| | Solvent resistance[9] | O | O | O | O | Δ |
| | Corrosion resistance[10] | | O | | O | Δ |

We claim:

1. A water-based paint composition comprising:
(A) 100 parts by weight of a hydrophilic film-forming resin component capable of curing through an oxidative polymerization reaction and having a plurality of pendant free carboxy groups; and
(B) 10 to 200 parts by weight of a hydrophobic film-forming resin component having a plurality of polymerizable carbon-to-carbon double bonds at terminals;
said component (A) being
(I) reaction product prepared by the steps of
(a) reacting (i) a butadiene-based polymer having an average number molecular weight of 500 to 5,000 and an iodine number of 100 to 500, a drying oil having an iodine number greater than 100, or a mixture thereof, with 100 to 300 millimoles, per 100 g of (i), of (ii) a dicarboxylic acid anhydride of the formula:

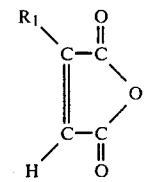

wherein $R_1$ represents a hydrogen atom, a halogen atom or methyl, and
(b) reacting the resultant product with at least 0.8 moles per mole of said acid anhydride of (iii) water, a primary monoalcohol, a dialkylamine or a mixture thereof, or
(II) either (i) a product prepared by reacting the product of said step (a) with 10 to 300 millimoles per 100 g of said butadiene-based polymer and/or said drying oil of a compound of the formula:

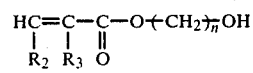

wherein $R_2$ and $R_3$ are as defined, and n is 2 or 3, and then optionally with less than 290 millimoles per 100 g of said butadiene-based polymer and/or said drying oil of water, a primary monoalcohol, a dialkylamine or a mixture thereof; (ii) a product prepared by reacting the product of said step (a) with 80 to 300 millimoles per 100 g of said butadiene-based polymer and/or said drying oil of water, a primary monoalcohol, a dialkylamine or a mixture thereof, and then with 10 to 500 millimoles per 100 g of said butadiene-based polymer and/or said drying oil of a monoglycidyl ester of the formula:

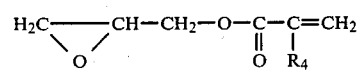

wherien $R_4$ is as defined; or a mixture of said products (i) and (ii); or
(III) a mixture of (I) and (II);
said component (B) being (i) a product prepared by reacting a compound having at least one glycidyl group and an average molecular weight of 300 to 4,000 with 0.8 to 1.1 moles per said glycidyl group of an ethylenically unsaturated carboxylic acid of the formula:

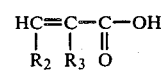

wherein $R_2$ and $R_3$ independent represent a hydrogen atom or methyl, or an unsaturated fatty acid having a molecular weight of 100 to 350 and an iodine number greater than 100, or (ii) a product prepared by reacting a polymeric phenol derivative having an average number molecular weight of 300 to 4,000 with at least 0.8 moles per moles of said phenol derivative of a monoglycidyl ester of the formula:

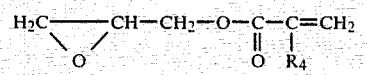

wherein $R_4$ represents a hydrogen atom or methyl, or (iii) a mixture of (i) and (ii);

said components (A) and (B) being dispersed in an aqueous medium containing an amount of a base sufficient to neutralize at least 20% of said free carboxylic groups to form a stable emulsion of resinous particles composed of a core of said component (B) surrounded by a shell layer of said component (A).

2. The water-based paint compositoin of claim 1, wherein said butadiene-based polymer is a homopolymer of butadiene, a copolymer of butadiene with another conjugated diene monomer or a minor proporation of a vinyl monomer.

3. The water-based paint composition of claim 1, wherein said compound having at least one glycidyl group in said component (B) is an epoxy resin.

4. The water-based paint composition of claim 1, wherein said polymeric phenol derivative in said component (B) is a phenol resin.

5. The water-based paint composition of claim 1 further comprising 0.005 to 1.0 parts by weight calculated as elementary metal of an organic acid salt of cobalt, manganese, iron, lead, calcium or zirconium, manganese dioxide or a mixture of these metallic compounds.

6. The water-based paint composition of claim 1, wherein said component (A) is at least partially (i) a product prepared by reacting the product of said step (a) with 10 to 300 millimoles per 100 g of said butadiene-based polymer and/or said drying oil of a compound of the formula:

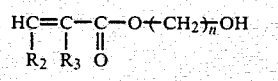

wherein $R_2$ and $R_3$ are as defined, and n is 2 or 3, and then optionally with less than 290 millimoles per 100 g of said butadiene-based polymer and/or said drying oil of water, a primary monoalcohol, a dialkylamine or a mixture thereof; (ii) a product prepared by reacting the product of said step (a) with 80 to 300 millimoles per 100 g of said butadiene-based polymer and/or said drying oil of water, a primary monoalcohol, a dialkylamine or a mixture thereof, and then with 10 to 500 millimoles per 100 g of said butadiene-based polymer and/or said drying oil of a monoglycidyl ester of the formula:

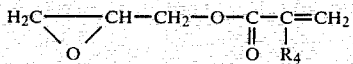

wherein $R_4$ is as defined; or a mixture of said products (i) and (ii).

7. The water-based paint composition of claim 5, wherein said butadiene-based polymer is a homopolymer of butadiene, a copolymer of butadiene with another conjugated diene monomer or a minor proportion of a vinyl monomer.

8. The water-based paint composition of claim 5, wherein said compound having at least one glycidyl group in said component (B) is an epoxy resin.

9. The water-based paint composition of claim 5, wherein said polymeric phenol derivative in said component (B) is a phenol resin.

10. The water based paint composition of claim 5 further comprising 0.005 to 1.0 parts by weight calculated as elementary metal of an organic acid salt of cobalt, manganese, iron, lead, calcium or zirconium, manganese dioxide or a mixture of these metallic compounds.

11. The water based paint composition of claim 1 further comprising a pigment.

12. An article of manufacture comprising a conductive substrate and an electro deposited coating of a paint composition according to claim 11.

13. The paint composition of claim 1, wherein (i) of step (a) employed to procedure (A) is liquid polybutadiene or a mixture thereof and linseed oil.

14. The paint composition of claim 1, wherein (ii) of step (a) employed to procedure (A) is maleic anhydride.

15. The paint composition of claim 1, wherein (iii) of step (b) employed to procedure (A) is ethylcellosolve, water or a mixture thereof.

* * * * *